(12) United States Patent
Henze et al.

(10) Patent No.: US 7,915,372 B2
(45) Date of Patent: Mar. 29, 2011

(54) THERMOPLASTIC POLYURETHANE COMPRISING SILANE GROUPS

(75) Inventors: Oliver Steffen Henze, Schneidlingen (DE); Sabine Peters, Nortrup (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 476 days.

(21) Appl. No.: 11/573,096

(22) PCT Filed: Aug. 4, 2005

(86) PCT No.: PCT/EP2005/008446
§ 371 (c)(1),
(2), (4) Date: Feb. 2, 2007

(87) PCT Pub. No.: WO2006/021310
PCT Pub. Date: Mar. 2, 2006

(65) Prior Publication Data
US 2008/0015328 A1    Jan. 17, 2008

(30) Foreign Application Priority Data
Aug. 24, 2004 (DE) .......................... 10 2004 041 141

(51) Int. Cl.
*C08G 77/24* (2006.01)

(52) U.S. Cl. ............... 528/28; 528/29; 528/38; 428/447

(58) Field of Classification Search .................. 525/28; 528/28, 29, 38; 428/447
See application file for complete search history.

(56) References Cited

U.S. PATENT DOCUMENTS

| | | | |
|---|---|---|---|
| 4,374,237 A * | 2/1983 | Berger et al. | 528/28 |
| 6,015,475 A * | 1/2000 | Hsieh et al. | 156/331.4 |
| 2002/0169255 A1 | 11/2002 | Lagneaux et al. | |

FOREIGN PATENT DOCUMENTS

| | | |
|---|---|---|
| WO | 98 37985 | 9/1998 |
| WO | 00 04069 | 1/2000 |
| WO | 2005 019296 | 3/2005 |
| WO | WO 2005019296 A1 * | 3/2005 |

OTHER PUBLICATIONS

Translation of WO 2005019296 A1.*
Dassin, Stephane et al.,"Thermoplastic Polyurethanes (TPUs) With Grafted Organosilane Moieties: A New Way of Improving Thermomechanical Behavior", Polymer Enginering and Science, vol. 42, No. 8, pp. 1724-1739, 2002.

* cited by examiner

*Primary Examiner* — Margaret G Moore
(74) *Attorney, Agent, or Firm* — Oblon, Spivak, McClelland, Maier & Neustadt, L.L.P.

(57) ABSTRACT

Thermoplastic polyurethane comprising the reaction product of an isocyanate (a) with a compound (i) having at least one group which is reactive toward isocyanates and also at least two organosilicon groups.

21 Claims, No Drawings

THERMOPLASTIC POLYURETHANE COMPRISING SILANE GROUPS

The invention relates to a thermoplastic polyurethane, in particular in the form of fibers, cable sheathing and flexible tubing, in particular compressed air hoses, comprising the reaction product of an isocyanate (a) with a compound (i) having at least one, preferably one, group which is reactive toward isocyanates, preferably a secondary amino group, and at least two, preferably two, organosilicon groups. In addition, the invention relates to a thermoplastic polyurethane comprising organosilicon groups in which in each case at least two, preferably two, organosilicon groups are joined via a urea group to the thermoplastic polyurethane. In addition, the invention relates to a thermoplastic polyurethane comprising the reaction product of an isocyanates (a) with a compound (I), having at least one group which is reactive toward isocyanates, in particular a hydroxyl group and/or primary and/or secondary amino group, preferably a secondary amino group, and at least two, preferably two, organosilicon groups. Furthermore, the invention relates to a process for preparing a thermoplastic polyurethane modified with organosilicon compounds, i.e. a thermoplastic polyurethane having organosilicon groups, and crosslinkable TPUs obtainable in this way, in particular fibers, cable sheathing and flexible tubing, in particular compressed air hoses, and also the corresponding products which have been crosslinked via the organosilicon groups, in particular siloxane groups.

Thermoplastic polymers are polymers which remain thermoplastic when repeatedly heated and cooled within the temperature range typical for processing and use of the materials. For the purposes of the present invention, the term thermoplastic refers to the ability of a polymer to soften when heated and harden when cooled in repeated heating-cooling cycles within a temperature range typical for it and to be repeatedly moldable by means of flow in the softened state to produce semifinished parts or articles in the form of molding, extrudates or thermoformed parts. Thermoplastic polymers are widespread in industry and are found in the form of fibers, plates, films, moldings, bottles, sheathing, packaging, etc. Thermoplastic polyurethane (hereinafter referred to as TPU) is an elastomer which is employed in many applications, e.g. shoe applications, films, fibers, ski boots, flexible tubing. The advantage which in the case of the TPU results from its ability to be thermoplastically processed is, however, at the same time a disadvantage of such a material in respect of the lower heat distortion resistance compared to crosslinked polymers. It would therefore be desirable to combine the advantages of thermoplastic processing with those resulting from the excellent heat distortion resistance of crosslinked polymers.

With a view to this objective, US 2002/0169255 and in S. Dassin et al in Polymer engineering and Science, August 2002, Vol, 42, No. 3, teach modification of a thermoplastic polyurethane with a silane coupled to the polyurethane by means of a crosslinker. Subsequently, e.g. after shaping, crosslinking of the originally thermoplastic polyurethane is achieved by hydrolysis of the silane. A disadvantage of these technical teachings is that a number of individual steps are necessary to obtain the crosslinked TPU. Thus, the thermoplastic polyurethane has to be subjected to two reactions, firstly with the crosslinker and subsequently with the silane. According to US 200210169255, the use of the crosslinker which binds the silane to the TPU is necessary since direct use of the silane is said to lead to degradation of the TPU.

It was an object of the present invention to develop a thermoplastic polyurethane, in particular fibers based on a thermoplastic polyurethane, comprising organosilicon groups, which polyurethane is obtainable via a simple, rapid and advantageous production process, has excellent crosslinking properties and, particularly when used as binders, has a very good level of properties in the crosslinked state.

These objects have been able to be achieved by the thermoplastic polyurethanes described at the outset.

The term "silane" as used in the present text refers to organosilane compounds. Accordingly, the term "modified with silane" means that the respective material has been modified with an organosilicon compound.

The use of compounds which have at least two silane groups introduces additional crosslinking opportunities into the TPU without significantly hindering the thermoplastic processability prior to crosslinking via the silane groups. The preferred use of secondary amines means, as desired, the reactivity is set to a moderate level, as a result of which chain terminations can be reduced and a higher molecular weight can be achieved.

According to the teachings of the present invention, the compound via which the silane is introduced into the TPU is built directly into the polyurethane. In contrast to the teachings of US 2002/0169255, it is not bound indirectly via a crosslinker to the TPU, but instead the silane is present in the TPU structure itself.

For the purposes of the present text, the terms "organosilicon compounds", "silanes", "organosilicon groups" and "silane groups" refer to compounds, in particular generally known alkoxysilanes, e.g. dimethoxysilanes or trimethoxysilanes and/or diethoxysilanes or triethoxysilanes, which preferably comprise the following general structural units:

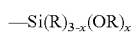

where R and x have the following meanings:

R: an alkyl radical or aryl radical which may optionally be heteroatom-substituted, preferably an alkyl radical having from 1 to 10, more preferably from 3 to 6, carbon atoms, preferably methyl and/or ethyl, x: 1, 2 or 3, preferably 2 or 3, particularly preferably 3, with the three alkyl radicals R present in the silane being able to be identical or different, preferably identical.

The secondary amines (i) which are preferred according to the invention preferably have the following general structure:

where R3, R2 and x have the following meanings:

R1: a hydrocarbon radical having from 2 to 20 carbon atoms, preferably an alkylene radical or arylene radical which may each optionally be heteroatom-substituted, preferably an alkylene radical having from 3 to 10, more preferably from 1 to 6, carbon atoms, preferably methylene, propylene or ethylene, particularly preferably propylene, R2: a hydrocarbon radical having from 2 to 20 carbon atoms, preferably an alkylene radical or arylene radical which may each optionally be heteroatom-substituted, preferably an alkylene radical having from 1 to 10, more preferably from 1 to 6, carbon atoms, preferably methylene, propylene or ethylene, particularly preferably propylene, x: 1, 2 or 3, preferably 2 or 3, particularly preferably 3, R: an alkyl radical or aryl radical which may each optionally be heteroatom-substituted, preferably an alkyl radical having from 1 to 10, more preferably from 1 to 6, carbon atoms, preferably methyl and/or ethyl, with the three alkyl radicals R in the silane being able to be identical or different, preferably identical.

As (i) secondary amine having at least two, preferably two, silane groups, preference is given to using bis(gamma-trimethoxysilylpropyl)amine:

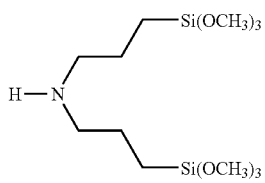

A further object was to develop an improved, simpler, more rapid and more economical process for preparing crosslinkable TPU, in particular a process for preparing a silane-modified thermoplastic polyurethane, i.e. a thermoplastic polyurethane having organosilicon groups.

This object has been able to be achieved by using a compound (I) having at least one group which is reactive toward isocyanates, in particular a hydroxyl group and/or primary and/or secondary amino group, preferably a secondary amino group, and at least two organosilicon groups in the preparation of the thermoplastic polyurethane Preference is given to the silanes mentioned at the outset, particularly preferably bis(gamma-trimethoxysilylpropyl)amine, as compound (i).

In the process of the invention, the silane group can be introduced directly into the TPU during its preparation. Costly additional steps such as reaction of the finished TPU with isocyanates and subsequent reaction of the isocyanate-modified TPU with silanes, as taught, for example, in US 2002/0169255, are not necessary. It has surprisingly been found that the silane groups which are integrated into the TPU during its preparation do not lead to crosslinks during further processing of the TPU prior to the actual shaping step. This is surprising since the work-up of the TPU, e.g. pelletization under water, may be carried out in the presence of moisture, which may be followed by drying at elevated temperatures. These hot-moist conditions usually permit the crosslinking reaction of the silanes which is, however, wanted only after the actual shaping step, i.e. after extrusion, injection molding or spinning.

The crosslinkable thermoplastic polyurethane is preferably prepared by reacting (a) isocyanates with (b) compounds which are reactive toward isocyanates and have a molecular weight in the range from 500 to 10000 g/mol and (c) chain extenders having a molecular weight of from 50 to 499 g/mol and compounds (i) having at least two organosilicon groups, if appropriate in the presence of (d) catalysts and/or (e) customary additives, with the ratio of the sum of the isocyanate groups of the component (a) to the sum of the isocyanate-reactive functions of the components (b), (c) and (i) and, if used, (d) and (e) being in the range from 0.7:1 to 1.3:1. This preferred ratio thus describes the molar ratio of all isocyanate groups to the sum of all isocyanate-reactive functions, i.e. reactive hydrogen atoms. This ratio is customarily also referred to as the index, with a ratio of 1:1 corresponding to an index of 100. At an index of 100, one active hydrogen atom, i.e. one isocyanate-reactive function, is present per isocyanate group of the component (a). At indexes above 100, more isocyanate groups than, for example, OH groups are present.

According to the invention, therefore, the incorporation of the silanes can be effected during the preparation of the TPU. If the preparation of the TPU is carried out in the presence of the silane, the molar ratio of the polyols and chain extenders (b) and (c) to the silanes (i) is preferably in the range from 5:1 to 20:1, particularly preferably from 10:1 to 15:1.

The term thermoplastic polyurethane means that it is preferably a thermoplastic elastomer based on polyurethane. A thermoplastic elastomer is an elastomer which remains thermoplastic when repeatedly heated and cooled within the temperature range typical for processing and use of the material. For the purposes of the present invention, the term thermoplastic refers to the ability of a polymer to soften when heated and harden when cooled in repeated heating-cooling cycles within a temperature range typical for it and to be repeatedly moldable by means of flow in the softened state to produce semifinished parts or articles in the form of molding, extrudates or thermoformed parts. After crosslinking via the silanes, the thermoplastic polyurethane can be processed thermoplastically to only a limited extent. However, for the purposes of the present text, this crosslinked, originally thermoplastic polyurethane is included under the term "thermoplastic polyurethane".

Thermoplastic polyurethanes are, in particular, TPUs which have a Shore hardness of from 50 A to 80 D. Furthermore, preference is given to TPUs which have one or more or preferably all of the following properties:

TPUs having
- a modulus of elasticity of from 10 MPa to 10.000 MPa measured in accordance with DIN EN ISO 527-2 on a test specimen of type A in accordance with DIN EN ISO 3167 at a test speed of 1 mm/min. The modulus of elasticity is calculated as the ratio of stress to strain from the initial rise in the stress-strain curve;
- a glass transition temperature $T_g$ measured by means of DSC (at 10/min) of from <minus 10° C. for grades having a Shore D hardness of up to 64 to <minus 40° C. for grades having a Shore A hardness of up to 85;
- a Charpy impact toughness in accordance with DIN 53453 (DIN EN ISO 179) without fracture down to minus 60° C. and a notched impact toughness of <minus 40° C. for grades having a Shore A hardness of less than 95 and <minus 20° C. for grades having a Shore D hardness up to 60;
- a density in accordance with DIN 53479 or ISO 1183 in the range from 1.05 to 1.30 g/cm$^3$
- a tensile strength of greater than 40 MPa measured in accordance with DIN 53504 or ISO 37 for unplasticized TPU grades;
- a tear propagation resistance measured in accordance with DIN 53515 or ISO 34 of greater than 65 MPa for (unplasticized) grades having a Shore A hardness of less than 95 and greater than 100 MPa for grades having a Shore D hardness of greater than 50.
- a compression set at 70° C. measured in accordance with DIN 53517 or ISO 815 in the range from 30 to 70%.

Processes for preparing thermoplastic polyurethanes, in this text also referred to as TPUs, are generally known. In general, TPUs are prepared by reacting (a) isocyanates with (b) compounds which are reactive toward isocyanates, usually compounds having a molecular weight ($M_w$) of from 500 to 10000, preferably from 500 to 5000, particularly preferably from 800 to 3000, and (c) chain extenders having a molecular weight of from 50 to 499, if appropriate in the presence of (d) catalysts and/or (e) customary additives. As indicated above, the silanes are preferably used in addition according to the invention.

The starting components and processes for preparing the preferred polyurethanes are described by way of example below. The components (a), (b), (c) and, if appropriate, (d) and/or (e) customarily used in the preparation of polyurethanes are described by way of example in the following:

a) As organic isocyanates (a), it is possible to use the generally known aliphatic, cycloaliphatic, araliphatic and/or aromatic isocyanates, for example trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI) naphthylene 1,5-diisocyanate (NDI), tolylene 2,4- and/or 2,6-diisocyanate (TDI), diphenylmethane diisocyanate, 3,3'-dimethylbiphenyl diisocyanate, 12-diphenylethane diisocyanate and/or phenylene diisocyanate. Preference is given to using 4,4'-MDI.

b) As compounds (b) which are reactive toward isocyanates, it is possible to use the generally known compounds which are reactive toward isocyanates, for example polyesterols, polyetherols and/or polycarbonate diols which are usually grouped together under the term "polyols" having molecular weights of from 500 to 8000, preferably from 600 to 6000, in particular from 800 to <3000, and preferably having a mean functionality toward isocyanates of from 1.8 to 2.3, preferably from 1.9 to 2.2, in particular 2. Preference is given to using polyether polyols, for example ones based on generally known starter substances and customary alkylene oxides for example ethylene oxide, propylene oxide and/or butylene oxide preferably polyetherols based on 1,2-propylene oxide and ethylene oxide and in particular polyoxytetramethylene glycols. The polyetherols have the advantage that they have a higher hydrolysis stability than polyesterols.

Furthermore, polyetherols having a low unsaturated content can be used as polyetherols. For the purposes of the present invention, polyols having a low unsaturated content are, in particular, polyether alcohols having a content of unsaturated compounds of less than 0.02 meq/g, preferably less than 0.01 meq/g.

Such polyether alcohols are usually prepared by addition of alkylene oxides, in particular ethylene oxide, propylene oxide and mixtures thereof, onto the above-described diols or triols in the presence of high-activity catalysts. Such high-activity catalysts are, for example, cesium hydroxide and multimetal cyanide catalysts, also known as DMC catalysts, A frequently used DMC catalysts is zinc hexacyanocobaltate, The DMC catalyst can be left in the polyether alcohol after the reaction, but is usually removed, for example by sedimentation or filtration.

Furthermore, it is possible to use polybutadienediols having a molar mass of 500-10000 g/mol, preferably 1000-5000 g/mol, in particular 2000-3000 g/mol. TPUs which are prepared using these polyols can be radiation-crosslinked after thermoplastic processing. This leads, for example, to improved burning behavior.

Instead of one polyol, it is also possible to use mixtures of various polyols.

c) Chain extenders (c) used are generally known aliphatic, araliphatic, aromatic and/or cycloaliphatic compounds having a molecular weight of from 50 to 499, preferably 2-functional compounds, for example diamines and/or alkanediols having from 2 to 10 carbon atoms in the alkylene radical, in particular 1,3-propanediol, 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oligopropylene and/or polypropylene glycols, with it also being possible to use mixtures of chain extenders.

Components a) to c) are particularly preferably bifunctional compounds, i.e. diisocyanate (a), bifunctional polyols, preferably polyetherols (b) and bifunctional chain extenders, preferably diols, d) Suitable catalysts which, in particular, accelerate the reaction between the NCO groups of the diisocyanates (a) and the hydroxyl groups of the formative components (b) and (c) are the known and customary tertiary amines, e.g. triethylamine, dimethylcyclohexylamine, N-methylmorpholine, N,N'-dimethylpiperazine, 2-(dimethylaminoethoxy)ethanol, diazabicyclo[2,2,2]octane and the like, and, in particular, organic metal compounds, e.g. titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate or the like. The catalysts are usually employed in amounts of from 0.0001 to 0.1 part by weight per 100 parts by weight of polyhydroxy compound (b).

e) In addition to catalysts (d), it is possible to add customary auxiliaries and/or additives (e) to the formative components (a) to (c). Examples which may be mentioned are blowing agents, surface-active substances, fillers, nucleating agents, lubricants and mold release agents, dyes and pigments, antioxidants, e.g. against hydrolysis, light, heat or discoloration, inorganic and/or organic fillers, flame retardants, reinforcing materials and plasticizers, metal deactivators. In a preferred embodiment, the component (a) also includes hydrolysis inhibitors such as polymeric and low molecular weight carbodiimides. The thermoplastic polyurethane in the materials according to the invention particularly preferably comprises melamine cyanurate which acts as flow retardant. Melamine cyanurate is preferably used in an amount of from 0.1 to 60% by weight, particularly preferably from 5 to 40% by weight, in particular from 15 to 25% by weight, in each case based on the total weight of the TPU. The thermoplastic polyurethane preferably comprises triazole and/or triazole derivative and antioxidants in an amount of from 0.1 to 5% by weight, based on the total weight of the thermoplastic polyurethane. Suitable antioxidants are in general materials which inhibit or prevent undesirable oxidative processes in the polymer to be protected. In general, antioxidants are commercially available. Examples of antioxidants are sterically hindered phenols, aromatic amines, thiosynergists, organophosphorus compounds of trivalent phosphorus and hindered amine light stabilizers. Examples of sterically hindered phenols may be found in Plastics Additive Handbook, 5th edition, H. Zweifel, ed, Hanser Publishers, Munich, 2001 ([1]), pp. 98-107 and p. 116-p. 121. Examples of aromatic amines may be found in [1]. pp. 107-108. Examples of thiosynergists are given in [1], pp. 104-105 and pp. 112-113. Examples of phosphates may be found in [1], pp. 109-112. Examples of hindered amine light stabilizer are given in [1], pp. 123-136. Phenolic antioxidants are particularly suitable for use in the antioxidant mixture according to the invention. In a preferred embodiment, the antioxidants, in particular the phenolic antioxidants, have a molar mass of greater than 350 g/mol, particularly preferably greater than 700 g/mol, and a maximum molar mass of <10000 g/mol, preferably <3000 g/mol. Furthermore, they preferably have a melting point of less than 180° C. Furthermore, preference is given to using antioxidants which are amorphous or liquid. It is likewise possible to use mixtures of two or more antioxidants as component (e).

In addition to the abovementioned components a), b) and c) and, if appropriate, d) and a), it is also possible to use chain regulators, usually ones having a molecular weight of from 31 to 3000. Such chain regulators are compounds which have only one functional group which is reactive toward isocyanates, e.g. monofunctional alcohols, monofunctional amines and/or monofunctional polyols. Such chain regulators enable a specific flow behavior to be set, in particular in the case of TPUs. Chain regulators can generally be used in an amount of from 0 to 5 parts by weight, preferably from 0.1 to 1 part by weight, based on 100 parts by weight of the component b) and by definition come under the component (c).

All molecular weights mentioned in this text have the unit [g/mol].

To set the hardness of the TPUs, the formative components (b) and (c) can be varied within a relatively broad molar ratio range, Molar ratios of component (b) to the total of chain extenders (c) to be used of from 10.1 to 1:10, in particular from 1:1 to 1:4, have been found to be useful, with the hardness of the TPUs increasing with increasing content of (c).

The TPUs can be prepared by known methods, either continuously, for example by means of reaction extruders or the belt process by the one-shot or prepolymer process, or batchwise by the known prepolymer process In these processes, the components (a), (b), (c) and, if appropriate, (d) and/or (e) can be mixed with one another in succession or simultaneously, with the reaction commencing immediately.

In the extruder process, the formative components (a), (b), (c) and, if appropriate, (d) and/or (e) are fed individually or as a mixture into the extruder, e.g. at temperatures of from 100 to 280° C., preferably from 140 to 250° C., and reacted. The TPU obtained is usually extruded, cooled and pelletized. After the synthesis, the TPU can, if appropriate, be modified on an extruder to convert it into a final desired form. In this conversion of the TPU into a final desired form, its melt flow index or pellet form, for example, can be modified in accordance with requirements.

The processing of the TPUs prepared according to the invention, which are usually in pellet or powder form, to produce injection-molded and extruded articles, e.g. the desired films, moldings, rollers, fibers, linings in automobiles, flexible tubing, cable connectors, bellows, towing cables, cable sheathing, seals, belts or damping elements, is carried out by customary methods, e.g. injection molding or extrusion. Such injection-molded and extruded articles can also comprise compounds comprising the TPU of the invention and at least one further thermoplastic polymer, in particular a polyethylene, polypropylene, polyester, polyether, polystyrene, PVC, ABS, ASA, SAN, polyacrylonitrile, EVA, PBT, PET, polyoxymethylene, in particular, the TPU prepared according to the invention can be used for producing the articles set forth at the outset.

The silane-modified thermoplastic polyurethane is preferably spun by generally known methods to produce fibers and the thermoplastic polyurethane is subsequently crosslinked via the silane groups by means of moisture, with a catalyst which accelerates crosslinking being used if appropriate. The crosslinking reactions via and by means of the silane groups are known to those skilled in the art and are generally known. This crosslinking is usually effected by moisture and can be accelerated by means of heat or catalysts known for this purpose, e.g. Lewis acids, Lewis bases, Brönsted bases, Brönsted acids. As catalysts for the crosslinking, preferably by means of moisture, preference is given to using carboxylic acids, e.g. acetic acid, organic metal compounds such as titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate or the like.

The product which has been crosslinked via the silane groups preferably has the following properties:

Vicat softening temperature (VST) in accordance with DIN EN ISO 306 (10N/120 K/h) greater than 130° C.

An important measure of the quality of an elastomer fiber is the heat distortion resistance.

It has surprisingly been found that the heat distortion resistance of the melt-spun fibers which have been crosslinked via silane groups has been significantly improved. Thus, a fiber without silane crosslinking according to the invention displays an HDT (heat distortion temperature), measured under a pretension of 0.04 mN/dtex; heating rate: 10 K/min; measurement range: 100° C.-250° C., The HDT could be increased to 168° C. by means of the crosslinking via the silane groups.

A further advantage of the crosslinking according to the invention of melt-spun elastomer fibers is the improved resistance to customary spin finishes. While melt-spun fibers without crosslinking according to the invention are attacked on contact with spin finishers even at relatively low temperatures (<120° C.) and in some cases completely destroyed fibers which are being crosslinked according to the invention display virtually no damage even at temperatures above 190° C.

The thermoplastically processable polyurethane elastomers of the invention can be used for extruded articles, injection-molded articles calendered articles and for powder slush processes. Preference is also given to, in addition to the fibers, cable sheathing based on the thermoplastic polyurethanes of the invention.

EXAMPLES

Example 1

Comparative Example

Elastollan® E 1195 A (Elastogran GmbH) was placed in a twin-screw mixer and kneaded at 210° C. for 9 minutes. The melt was cooled.

Example 2

Elastollan® E 1195 A was placed in a twin-screw mixer and kneaded at 210° C. for 3 minutes. 2.5 percent by weight of bis(gamma-trimethoxysilylpropyl)amine, based on the total mass of the E 1195A material used, were then added and the mixture was kneaded at 210° C. for a further 6 minutes. The melt was cooled.

Example 3

Elastollan® E 1195 A was placed in a twin-screw mixer and kneaded at 210° C. for 3 minutes. 7.5 percent by weight of bis(gamma-trimethoxysilyipropyl)amine, based on the total mass of the E 1195A material used, were then added and the mixture was kneaded at 210° C. for a further 6 minutes. The melt was cooled.

Example 4

Comparative Material

A polyether TPU prepared in a synthesis step by mixing PolyTHF 1000 (500 g), MDI (415 g) and butanediol (115 g) is processed to produce injection-molded plates.

Example 5

A polyether TPU prepared in a synthesis step by mixing PolyTHF 1000 (800 g), bis(gamma-trimethoxysilylpropyl)amine (17 g), MDI (684 g) and butanediol (171 g) is processed to produce injection-molded plates,

Example 6

A polyether TPU prepared in a synthesis step by mixing PolyTHF 1000 (800 g), bis(gamma-trimethoxysilylpropyl)amine (35 g), MDI (684 g) and butanediol (171 g) is processed to produce injection-molded plates.

Example 7

Comparative Example

A polyester TPU prepared in a synthesis step by mixing a polyesterol based on hexanediol, butanediol and adipic acid (1000 g), MDI (425 g) and butanediol (107 g) is processed to produce injection-molded plates.

Example 8

A polyester TPU prepared in a synthesis step by mixing a polyesterol based on hexanediol, butanediol and adipic acid (940 g), bis(gamma-trimethoxysilylpropyl)amine (21 g), MDI (425 g) Elastostab® H01 (Elastogran GmbH) (8 g) and butanediol (107 g) is processed to produce injection-molded plates

Example 9

Comparative Example

A polyether TPU prepared using a reaction extruder with attached underwater pelletization and comprising PolyTHF 1000 (500 parts), MDI (415 parts) and butanediol (115 parts) is processed to produce injection-molded plates.

Example 10

A polyether TPU prepared using a reaction extruder with attached underwater pelletization and comprising PolyTHF 1000 (500 parts), bis(gamma-trimeth-oxysilylpropyl)amine (55 parts), MDI (423 parts) and butanediol (115 parts) is processed to produce injection-molded plates, The materials obtained in Examples 1-10 are soluble in DMF. The materials are then stored in water at 80° C. for 48 hours. After this treatment, the materials obtained in Examples 1, 4, 7 and 9 are soluble in DMF. The materials obtained in Examples 2, 3, 5, 6, 8, 10 are not completely soluble in DMF, The proportion of insoluble material is 40-70%°

Example 11

Physical Properties

TABLE 1

Specimens from Example 9 after storage in water, stress-strain values at room temperature at 120° C.

| Content of bis(gamma-trimeth-oxysilyl-propyl)amine | Test temperature | Sigma 5 in MPa | Sigma 10 in MPa | Sigma 20 in MPa | Sigma 50 in MPa |
|---|---|---|---|---|---|
| 0% | RT | 2.2 | 3.5 | 5.4 | 8.2 |
| 0% | 120° C. | 1.1 | 1.6 | 2.2 | 3.1 |

Example 12

Physical Properties

TABLE 2

Specimens from Example 10 after storage in water, stress-strain values at room temperature at 120° C.

| Content of bis(gamma-trimeth-oxysilyl-propyl)amine | Test temperature | Sigma 5 in MPa | Sigma 10 in MPa | Sigma 20 in MPa | Sigma 50 in MPa |
|---|---|---|---|---|---|
| 5% | RT | 3.6 | 5.6 | 7.7 | 10.2 |
| 5% | 120° C. | 2.0 | 2.9 | 3.7 | 4.3 |

The crosslinked TPU displayed an improved stress/strain behavior,

TABLE 3

Specimens from Example 9 and Example 10, Vicat softening temperature and modulus of elasticity

| | Tests on injection-molded articles | | |
|---|---|---|---|
| bis(gamma-trimethoxysilylpropyl)amine [% by weight] | Hardness [Shore A] | Modulus of elasticity [MPa] | Vicat DIN ENISO 306 (10 N/120K/h) [° C.] |
| 0 (Example 9) | 93 | 42 | 116 |
| 5 (Example 10) | 95 | 74 | 135 |

The crosslinked TPU displays higher modulus of elasticity values and a higher Vicat softening temperature.

The specimens from Example 9 and Example 10 were subjected to a hot set test (based on EN 60811-2-1). The specimens were loaded at 180° C. at a cross section of 1 cm² with various weights in each case.

| bis(gamma-trimethoxysilylpropyl)amine % | 180° C./100 g | | 180° C./200 g | | 180° C./300 g | |
|---|---|---|---|---|---|---|
| | 1st measurement % | 2nd measurement % | 1st measurement % | 2nd measurement % | 1st measurement % | 2nd measurement % |
| 0 (Ex. 9) | ruptured | | ruptured | | ruptured | |
| 5 (Ex. 10) | 0 | 0 | 30 | 20 | 50 | 40 |

Fibers melt-spun from the TPU from Example 10 had the following properties: an HDT (heat distortion temperature measured under a pretension of 004 mN/dtex; heating rate: 10 K/min; measurement range from 100° C. to 250° C.) of 168° C.

The invention claimed is:

1. A thermoplastic polyurethane comprising:
   at least one group comprising at least two organosilicon groups obtained by reaction of a mixture comprising:
   a) isocyanates consisting of diisocyanates;
   b) compounds which are reactive toward isocyanates;
   c) chain extenders comprising isocyanate reactive groups; and
   i) compounds comprising one group reactive to isocyanate groups and at least two organosilicon groups,
   wherein
   the thermoplastic polyurethane is a solid having a Shore hardness of 50 A to 80D,
   a molar ratio of the b) compounds which are reactive toward isocyanates and c) chain extenders to the i) compounds comprising one group reactive to isocyanate groups and at least two organosilicon groups in the reaction, is from 5:1 to 20:1, and
   the at least one group consisting of at least two organosilicon groups is located at a chain terminal of the thermoplastic polyurethane.

2. The thermoplastic polyurethane according to claim 1, wherein the compound comprising one group reactive to isocyanate groups and at least two organosilicon groups is a secondary amine having the structure

$(R)_{3-x}(OR)_xSi—R_1—NH—R_2—Si(R)_{3-x}(OR)_x$ wherein
   $R_1$ and $R_2$ are independently a hydrocarbon radical having from 2 to 20 carbon atoms optionally substituted with a heteroatom,
   x is 1, 2 or 3, and
   R independently of one another are an alkyl or aryl radical, optionally substituted with a heteroatom.

3. The thermoplastic polyurethane according to claim 2, wherein the secondary amine is bis(gamma-trimethoxysilylpropyl)amine.

4. The thermoplastic polyurethane according to claim 1, wherein the reaction mixture optionally further comprises at least one of (d) at least one catalyst and (e) a customary additive.

5. The thermoplastic polyurethane according to claim 4, wherein a ratio of the sum of the isocyanate groups of the isocyanates (a) to a sum of the isocyanate-reactive functions of the components (b), (c) and (i) and, optionally, (d) and (e) is in a range from 0.7:1 to 1.3:1.

6. The thermoplastic polyurethane according to claim 1, wherein the a) isocyanates consisting of diisocyanates are selected from the group consisting of aliphatic, cycloaliphatic, araliphatic and aromatic isocyanates.

7. The thermoplastic polyurethane according to claim 1, wherein the a) isocyanates consisting of diisocyanates are selected from the group consisting of trimethylene, tetramethylene, pentamethylene, hexamethylene, heptamethylene octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and 1,3-bis(isocyanatomethyl)cyclohexane (HXDI), 1,4-cyclohexane diisocyanate, 1-methylcyclohexane 2,4- and 2,6-diisocyanate, dicyclohexylmethane 4,4'-, 2,4'- and 2,2'-diisocyanate, diphenylmethane 2,2'-, 2,4'- and 4,4'-diisocyanate (MDI), naphthylene 1,5-diisocyanate (NDI), tolylene 2,4- and 2,6-diisocyanate (TDI), diphenylmethane diisocyanate, 3,3'-dimethylbiphenyl diisocyanate, 1,2-diphenylethane diisocyanate and phenylene diisocyanate.

8. The thermoplastic polyurethane according to claim 1, wherein the a) isocyanates consisting of diisocyanates is 4,4'-diphenylmethane diisocyanate.

9. The thermoplastic polyurethane according to claim 1, wherein the (b) compounds which are reactive toward isocyanates are selected from the group consisting of polyesterols, polyetherols and polycarbonate diols having molecular weights of from 500 to 8000, and having a mean functionality toward isocyanates of from 1.8 to 2.3.

10. The thermoplastic polyurethane according to claim 9, wherein the (b) compounds which are reactive toward isocyanates are polyether polyols based on ethylene oxide, propylene oxide and/or butylene oxide.

11. The thermoplastic polyurethane according to claim 1, wherein the a) isocyanates consisting of diisocyanates, b) compounds which are reactive toward isocyanates, and c) chain extenders are bifunctional compounds.

12. The thermoplastic polyurethane according to claim 1, wherein the chain extender c) has two groups reactive to isocyanate and is a compound selected from the group consisting of 1,3-propanediol, 1,4-butanediol and 1,6-hexanediol.

13. The thermoplastic polyurethane according to claim 1, wherein the at least two organosilicon groups located at a chain terminal are joined to the thermoplastic polyurethane via a urea group.

14. A process for preparing the thermoplastic polyurethane according to claim 1, comprising:
   reacting a) isocyanates consisting of diisocyanates, b) compounds which are reactive toward isocyanates, c) chain extenders; and
   i) compounds comprising at least one group reactive to isocyanate groups and at least two organosilicon groups, to directly obtain the thermoplastic polyurethane.

15. The process according to claim 14, wherein
   the (b) compounds which are reactive toward isocyanates have a molecular weight of from 500 to 10000,
   the (c) chain extenders have a molecular weight of from 50 to 499, and the (i) compounds comprising at least one group reactive to isocyanate groups and at least two organosilicon groups are secondary amines having at least two organosilicon groups.

16. The process according to claim 14, further comprising:
spinning the obtained thermoplastic polyurethane modified with organosilicon compounds to produce fibers and
crosslinking the thermoplastic polyurethane by reaction of the silane groups with moisture.

17. The process according to claim 16, wherein the crosslinking comprises a catalyst selected from the group consisting of Lewis acids, Lewis bases, Brönsted bases, and Brönsted acids.

18. A spun thermoplastic polyurethane obtained according to the process of claim 16.

19. A fiber comprising the spun thermoplastic polyurethane according to claim 7.

20. A cable sheathing comprising the thermoplastic polyurethane obtainable according to claim 1.

21. An extruded article, injection method article, or a calendered article comprising the thermoplastic polyurethane according to claim 1.

* * * * *